(12) United States Patent
Lingg et al.

(10) Patent No.: US 9,880,853 B2
(45) Date of Patent: Jan. 30, 2018

(54) SENSOR WITH APPLICATION PROGRAM

(71) Applicant: SICK AG, Waldkirch (DE)

(72) Inventors: Oliver Lingg, Waldkirch (DE); Mathis Zeiher, Waldkirch (DE); Matthias Puski, Waldkirch (DE)

(73) Assignee: SICK AG, Waldkirch (DE)

( * ) Notice: Subject to any disclaimer, the term of this patent is extended or adjusted under 35 U.S.C. 154(b) by 355 days.

(21) Appl. No.: 14/612,924

(22) Filed: Feb. 3, 2015

(65) Prior Publication Data

US 2015/0227380 A1    Aug. 13, 2015

(30) Foreign Application Priority Data

Feb. 7, 2014  (DE) .......................... 10 2014 101 575

(51) Int. Cl.
*G06F 17/30* (2006.01)
*G06F 9/44* (2006.01)
*H04L 29/08* (2006.01)
*G06F 9/445* (2006.01)

(52) U.S. Cl.
CPC ............ *G06F 9/4401* (2013.01); *G06F 9/445* (2013.01); *G06F 9/44505* (2013.01); *G06F 17/30371* (2013.01); *H04L 67/34* (2013.01)

(58) Field of Classification Search
CPC .... G06F 9/4401; G06F 9/445; G06F 9/44505; G06F 17/30371; H04L 67/34
USPC ....................................................... 707/693
See application file for complete search history.

(56) References Cited

U.S. PATENT DOCUMENTS

| 6,446,192 | B1 | 9/2002 | Narasimhan et al. |
| 8,365,164 | B1* | 1/2013 | Morgenstern ............. G06F 8/61 717/108 |
| 2005/0021756 | A1* | 1/2005 | Grant ..................... G06Q 30/02 709/226 |
| 2010/0223322 | A1* | 9/2010 | Mott ................. G06F 17/30905 709/203 |

FOREIGN PATENT DOCUMENTS

DE    102006057708 A1    6/2008

OTHER PUBLICATIONS

German Office Action issue in corresponding German Application No. 102014101575.4.
Zukowski, J.: Java AWT Reference. Sebastopol, USA: O'Reilly, 1997. S. 999-1002.—ISBN 978-1-56592-240.2. URL: http://www.oreilly.com/openbook/javawt/book/appb.pdf.

* cited by examiner

*Primary Examiner* — Evan Aspinwall
(74) *Attorney, Agent, or Firm* — Nath, Goldberg & Meyer; Jerald L. Meyer

(57) ABSTRACT

A sensor having a control and evaluation unit (2) and a memory unit (4), wherein an application program (6) for parameterizing and/or diagnosis is provided for the sensor (1), wherein an HTML description (8) is stored in the memory unit (4) wherein the HTML description (8) includes a bootstrap loading mechanism (10), wherein the bootstrap loading mechanism (10) is configured to transfer the application program (6) into a browser (12) on an end device (14) and the application program (6) can be started in the browser (12).

7 Claims, 2 Drawing Sheets

SENSOR WITH APPLICATION PROGRAM

Figure 1:
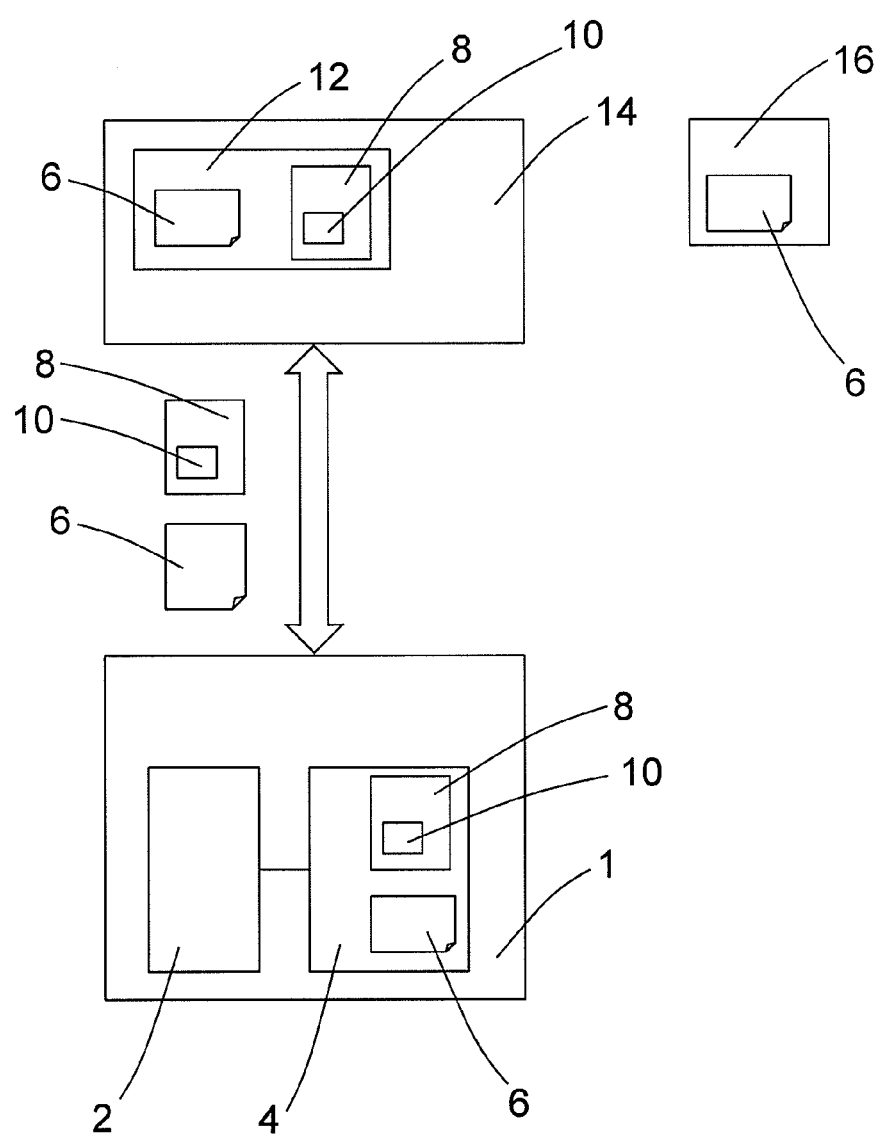

The present invention relates to a sensor having a control and evaluation unit and a memory unit, wherein an application program for parameterizing and/or diagnosis is provided for the sensor.

Sensors frequently have a plurality of parameters and are thereby difficult to configure. This configuration is simplified for the user by instruments and/or engineering tools, for example the tool and/or instrument SOPAS ET of the applicant, in that it makes available an intuitive surface for sensor configuration and monitoring. Such engineering tools can, however, not be executed in browsers and have to be installed at the respective data processor and/or personal computer. Administrator rights are frequently required at the data processor and/or the personal computer for this purpose which complicates the installation process or possibly even renders the installation process impossible.

Contemporary application programs are more and more frequently made available as web application programs, this means that the application no longer has to be installed on the personal computer, but runs completely in a browser, such as, for example Google Chrome, Mozilla Firefox, Microsoft Internet Explorer or mobile browsers. Thereby the application programs only have to be developed once and are completely platform independent. The application programs can be executed both on desktop computers, such as for example personal computers, and also on mobile devices such as tablets and smartphones.

Sensors in accordance with the state of the art frequently include an integrated web server and make available HTML pages, this means the page generation takes place by means of the sensor itself. Thus, a web application program in accordance with the state of the art is fixedly integrated into the sensors and cannot be exchanged in a simple manner. The HTML pages are provided at a browser via an HTTP interface, possibly a data exchange also takes place via XML.

Small sensors frequently do not have the required resources in order to make available complex applications, for example, due to a microcontroller weak in performance. Various devices and/or sensors in accordance with the state of the art merely have a very limited user interface. The requirements on the data processors, for example, on a microprocessor or a microcontroller are very high through a generation of pages at the device and can interfere with or influence the sensor function and/or the sensor application. An adaptability of the sensor is only possible by means of a firmware update or a parameterization. Firmware updates are possibly critical, as errors during a firmware update can lead to a disruption of the sensor operation.

In accordance with the DE 10 2006 057 708 A1 data from a device description file is stored in the sensor in a form that can be displayed by a standard software for the provision of a user interface, for example data is stored in HTML for display in a standard browser.

An object of the invention consists therein of utilizing the advantages of a mobile device with a web application program for the sensor configuration and for the taking into operation of a sensor. In this way a user, for example a person putting the sensor into operation, should, for example be able to use a mobile data processor, for example a tablet PC for the configuration of the sensor. For this purpose, for example, a data transfer should take place via a radio communication or a network.

A further important application is an implementation into external systems, for example human machine interfaces (HMIs) or SCADA systems (supervisory control and data acquisition system).

The object is satisfied by a sensor having a control and evaluation unit and a memory unit, wherein an application program for parameterizing and/or diagnosis is provided for the sensor, wherein an HTML description is stored in the memory unit, wherein the HTML description includes a bootstrap loading mechanism, wherein the bootstrap loading mechanism is configured to transfer the application program into a browser on an end device and the application program can be started in the browser.

In accordance with the invention the application program is moved from the sensor to a client in this case the browser at the end device. This leads to the advantage that the page generation takes place on the client and/or the end device and no longer at the sensor. Instead of displaying individual HTML pages a complete self-contained application program, which can easily be exchanged, is executed at the end device, namely on the browser. For this reason, the sensor itself has no web server.

As the sensor is no longer burdened with the generation of the application program, this means the generation of HTML pages, the sensor can be produced more cost-effectively, as the control and evaluation unit is no longer pre-occupied with the generation of HTML pages. As the execution of the application program takes place through the generation of the HTML pages on the end device, which is frequently in any way present as a high performance end device, for example as a personal computer, the generation of the HTML pages can be carried out faster than if this were to take place at the sensor As the sensor is parameterized and/or diagnosed by the application program by means of HTML pages, the application program is platform independent. The application program does not have to be adapted to various operating systems.

In accordance with the invention the application program can be adapted also in a very simple manner. Following an adaptation of the application program this only has to be exchanged.

The firmware itself, which primarily makes available the function of the sensor itself, no longer has to be adapted or changed on an update of the application program. This means that the firmware and the application program can be exchanged independent of one another.

Very good development tools, such as for example JavaScript or TypeScript are available for the browser-based application program.

The bootstrap loading mechanism is configured for the purpose of reading in and interpreting the application program. For example, the description file includes surface elements and further basic settings for a user interface. The bootstrap loading mechanism is a static HTML page. This means that the bootstrap loading mechanism is, for example not generated by an automaton during a program runtime. Due to the fact that the bootstrap loading mechanism is a static HTML page the bootstrap loading mechanism is configured to load a static, fixedly linked application program in the bootstrap loading mechanism. The bootstrap loading mechanism is present, for example in the application layer, for example in a level 7 and/or layer 7, in the open systems interconnection reference model.

The HTML description that includes the bootstrap loading mechanism is in this respect transferred by an action, either a user action or an automated action, into the browser in the end device. A user action is, for example, a simple mouse click in order to initiate a parameterization and/or a diagnosis of the sensor. An automated action is, for example, a parameterization and/or diagnosis introduced by an automaton.

The bootstrap loading mechanism starting from the browser on the end device then transfers the application program to the end device. Following this the application program is started by the bootstrap loading mechanism in the browser.

The bootstrap loading mechanism is in the respect in accordance with the invention always made available by the sensor, whereby the correct bootstrap loading mechanism is automatically always present for the associated sensor.

The application program is configured to read-in a description of a user interface following the start and to dynamically assemble the user interface.

In a preferred embodiment the application program is stored in the memory unit. This has the advantage that all of the software components required for the configuration and/or diagnosis are themselves made available at the sensor. Merely the browser has to be made available on the end device.

In an alternative embodiment the application program is stored in the external data processor. Thereby the application program does not have to be made available at the sensor itself. For example, the application program is loaded by the sensor via an internet connection from the external data processor and is then transferred to the end device and started in the browser.

In an embodiment of the invention the application program is present in a compressed container format, for example ZIP or RAR, wherein the bootstrap loading mechanism decompresses and/or extracts the compressed container format of the application program. Due to the fact that the application program is present in a compressed container format, the application program requires less memory such that, for example, comprehensive application programs can, for example, even be stored on the memory unit of the sensor. A storage of the application program on an external data processor is also of advantage through the compressed container format, as, for example, very many different application programs for very many different sensors can thus be stored in a space saving way at the data processor. Thereby a simple adaptability is ensured. Merely the container application program has to be exchanged.

In an embodiment of the invention the description of the user interface is described in at least one file. For example, this is an XML file in this respect. XML stands for Extensible Markup Language. XML is a markup language for the illustration of hierarchically structured data in the form of text files. XML files have the advantage that these enable a platform independent and implementation independent exchange of data. XML files thus enable a simple, compatible and generally valid description of the user interface.

The description of the user interface can, however, also be stored in a JSON file. JSON stands for Java Script Object Notation and is a compact data format or data exchange format which is present in a simple text form for the purpose of the data exchange between applications. JSON is a descriptive description language. JSON is independent of a used programing language.

In accordance with a preferred embodiment the user interface is a single page web application. The single page web application is also referred to as "Single-Page-App" and forms a modern application concept. A website which consists of a single HTML document and whose content can be dynamically downloaded is referred to as a single page web application. This kind of website design stands in contrast to classical websites which are composed of a plurality of HTML documents linked amongst one another. An operation of the application program in nearly all browsers is possible through the single page web application. Thus, the application program can, for example, be executed also on mobile end devices, such as smartphones or tablet PCs.

In an embodiment of the invention the end device is a personal computer, a tablet PC, a laptop, a notebook, a netbook, a cellular phone, an input/output unit of a machine or a smartphone. Thereby the sensor can be parameterized or diagnosed by means of the mentioned different end devices. Thereby the sensor can be parameterized or diagnosed with the end device which is currently available. For example, a smartphone can be used, as a smartphone is manageable and frequently is in any way present at the user. Thereby a flexible parameterization and/or diagnosis of the sensor is possible for the user.

In an embodiment of the invention the user interface is adapted to the end device. Thereby an ideal illustration at the respective end device is ensured. In this respect a graphic illustration and/or text-based illustration is adapted to the end device.

In an embodiment the sensor has a REST interface (REpresentational State Transfer interface) in order to use a connection between the sensor and the end device. In accordance with the REST interface it is provided that a uniform resource locator, also referred to as URL illustrates precisely one result in an action.

The REST interface uses a stateless client server protocol, wherein, in the normal case of application, HTTP or HTTPS is used. Each REST message in this respect includes all information which is required for the end device in order to understand the message. Neither the sensor nor the application should store state information between two messages. Such a strict separation of the responsibilities between the client and the server leads to the fact that a REST conform web service can be referred to as stateless. Each request of the application program made with respect to the sensor is self-contained in the sense that it includes all information on the application state which is required for the processing of the request by the sensor.

Stateless in the manner described in this context favorably impacts the scalability of a web service. As each request is self-contained and application information is thus exclusively available at the side of the application program, no session maintenance is required on the sensor side. In contrast to this, however, many HTTP based applications in accordance with the state of the art use cookies and other technologies for this purpose in order to retain state information.

The invention will be described in the following also with regard to further advantages and features with reference to the submitted drawing by means of embodiments. The Figures of the drawing show in:

FIG. 1 a sensor and an end device having the application program, and

Figure 2:
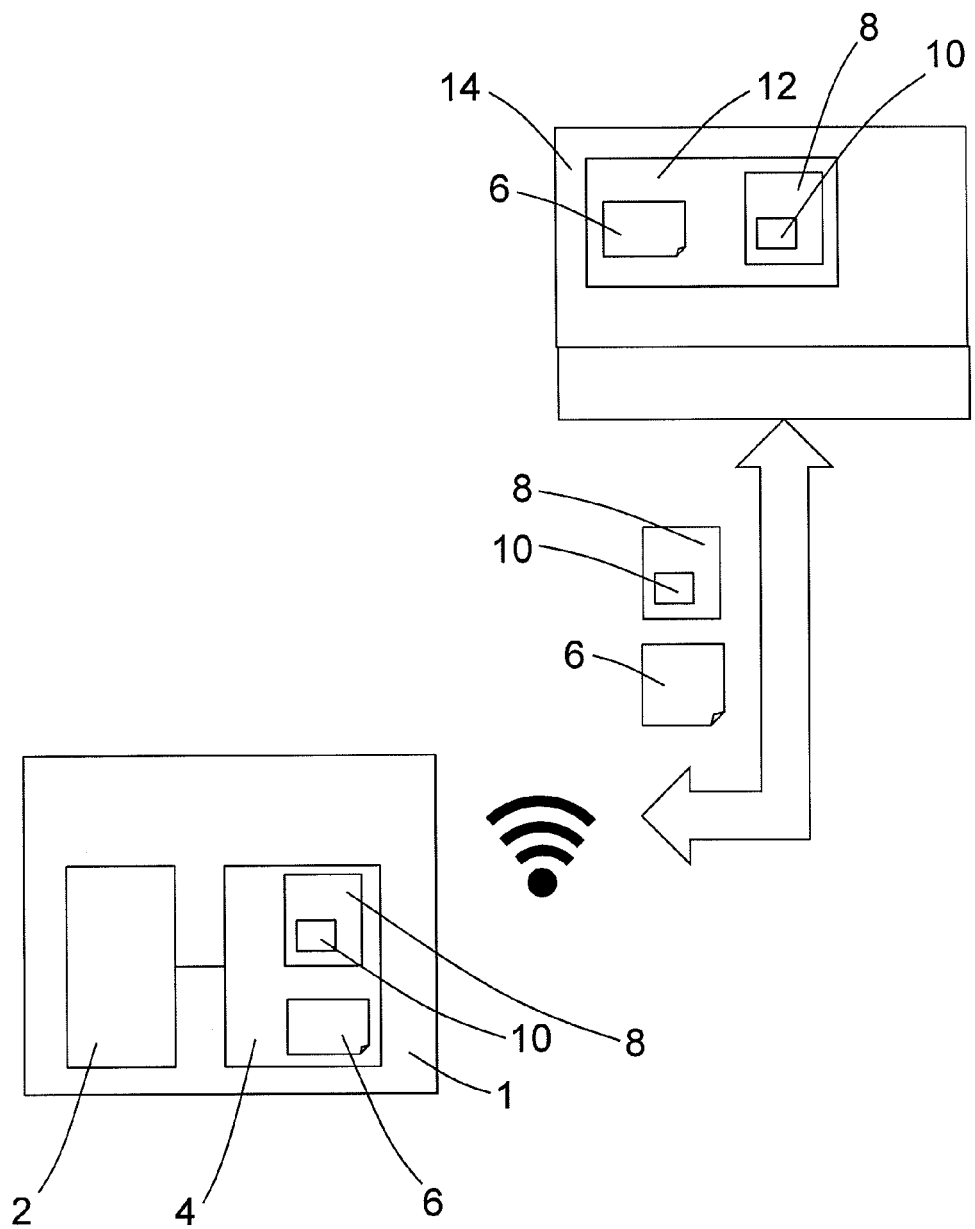

FIG. 2 a sensor and an end device having a radio communication.

In the following Figures identical parts are referred to using identical reference numerals.

FIG. 1 shows a sensor 1 having a control and evaluation unit 2 and a memory unit 4, wherein an application program 6 for parameterizing and/or diagnosis is provided for the sensor 1, wherein an HTML description 8 is stored in the memory unit 4, wherein the HTML description 8 includes a bootstrap loading mechanism 10, wherein the bootstrap loading mechanism 10 is configured to transfer the application program 6 into a browser 12 on an end device 14 and the application program 6 can be started in the browser 12.

For example, the application program 6 can be stored in the memory unit 4. However, it can also be provided that the application program 6 is stored on an external data processor 16. In this connection it is provided that the application program 6 is transferred to the end device 14 via an internet connection.

The application program 6 is present, for example, in a compressed container format, for example ZIP or RAR, wherein the bootstrap loading mechanism 10 is configured to decompress and/or to extract the compressed container format of the application program 6.

A complete application program 6 is generated, for example with Type-Script and/or Java-Script. This application program 6 can easily be adapted by means of a description language. The sensor 1 has an http interface. Via this http interface the application program 6 and the sensor can exchange object data by means of Java Script Object Notation (JSON). JSON is a compact data format in a text form easily readable for humans and machines for the purpose of the data exchange of applications, in this case between the sensor 1 and the application program 6 in the browser 12.

The files of the application program 6 themselves are not executable and/or cannot start on their own. In order to start these files, a bootstrap loading mechanism 10, also known using the term "bootstrap" is provided. The bootstrap loading mechanism 10 is configured to read in and to interpret at least one description file of the application program 6. This bootstrap loading mechanism 10 is included in a common HTML file which can be started via a browser 12 and is, for example, stored at the sensor 1. This HTML file loads the application program 6 from an internal source, namely the memory unit 4 or an external source, namely the external data process 16 and starts this at the end device 14 in the browser 12.

The bootstrap loading mechanism 10 is a static HTML page. The HTML description 8, which includes the bootstrap loading mechanism 10, is in this respect transferred by an action, either a user action or an automated action, into the browser 12 in the end device 14. A user action is, for example, a simple mouse click in order to implement a parameterization and/or a diagnosis of the sensor. An automated action is, for example, a parameterization and/or diagnosis implemented by an automaton.

The bootstrap loading mechanism 10 then starting from the browser 12 on the end device 14 transfers the application program 6 to the end device 14. Following this, the application program 6 is started by the bootstrap loading mechanism 10 in the browser 12.

The application program 6 is configured to read-in a description of a user interface following the start and to dynamically assemble the user interface. The description of the user interface is described in at least one file. In this connection it can, for example, be an XML file. In accordance with the example, the user interface is a single page web application.

The end device 14 is, for example, a PC, a tablet PC, a laptop, a notebook, a netbook, a cellular phone, an input/output unit of a machine or a smartphone. The user interface is respectively adapted to the end device 14. Thus, the assembly of the pages with regard to graphics and text is adapted to the respectively used display of the end device. For example, the text size is adapted to the respective display.

In accordance with FIG. 2 a wireless connection, for example a radio communication, for example a Bluetooth or Wireless LAN (WLAN) connection, is provided between the sensor 1 and the end device 14. For this purpose an additional communication program is required, which is installed at the respective end device 14. This is in the position to start the application program 6 in the browser 12 on the end device 14.

LIST OF REFERENCE NUMERALS

1 sensor
2 control and evaluation unit
4 memory unit
6 application program
8 HTML descriptor
10 bootstrap loading mechanism
12 browser
14 end device
16 external data processor

What is claimed is:

1. A sensor comprising:
    a control and evaluation unit;
    a memory unit; and
    a communication link enabling a connection between the sensor and an end device,
    wherein an application program for parameterizing and/or diagnosis is provided for the sensor, the application program present in a compressed container format, said application program not executable at the sensor and configured so it cannot start on its own at the sensor,
    wherein an HTML description is stored in the memory unit, wherein the HTML description includes a bootstrap loading mechanism configured to read in and to interpret at least one description file of the application program, the bootstrap loading mechanism configured to transfer the application program into a browser on the end device allowing starting the application program in the browser to provide graphics and text for display on the end device,
    wherein the bootstrap loading mechanism is configured to decompress and/or to extract the compressed container format of the application program,
    and wherein the HTML description permits generation of HTML pages on an external data processor or an external end device, and the generated HTML pages provides a user interface in at least one file of the application program as a single page web application.

2. The sensor in accordance with claim 1, wherein the application program is stored in the memory unit.

3. The sensor in accordance with claim 1,
    wherein the application program is stored in the external data processor,
    and wherein an update of the application program through firmware takes effect with the firmware and the application program exchanged independent of one another.

4. The sensor in accordance with claim 1, wherein the compressed container format is one of ZIP and RAR.

5. The sensor in accordance with claim 1, wherein the end device is selected from the group comprising a personal computer, a tablet PC, a laptop, a notebook, a netbook, a cellular phone, an input/output unit of a machine and a smartphone.

6. The sensor in accordance with claim 1, wherein the user interface is adapted to the end device.

7. The sensor in accordance with claim 1, wherein the bootstrap loading mechanism comprises a static HTML page which provides said least one description file of the application program.

* * * * *